Sept. 17, 1957     K. L. WESTLIN     2,806,550
DUST SEPARATORS OR CONCENTRATORS OF THE CYCLONE TYPE
Filed Dec. 9, 1953     2 Sheets-Sheet 1

*INVENTOR.*
KARL L. WESTLIN

Sept. 17, 1957  K. L. WESTLIN  2,806,550
DUST SEPARATORS OR CONCENTRATORS OF THE CYCLONE TYPE
Filed Dec. 9, 1953  2 Sheets-Sheet 2
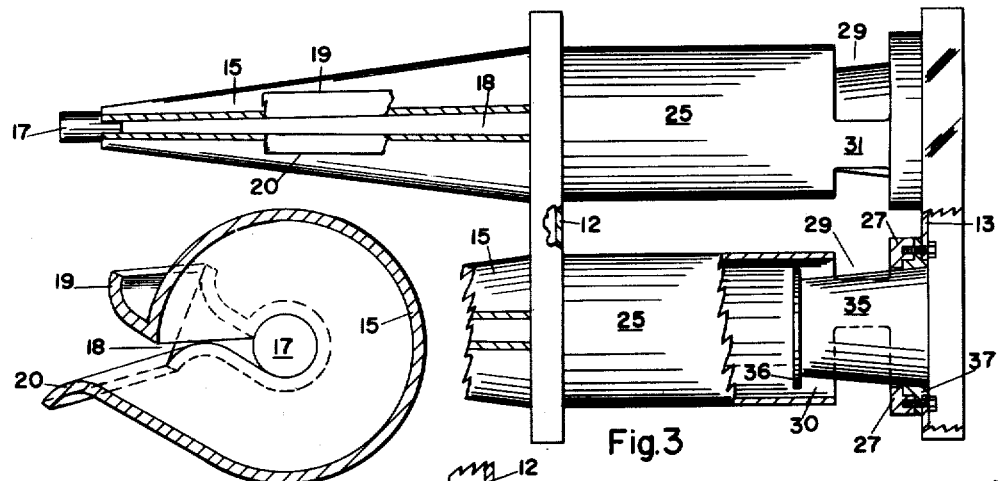
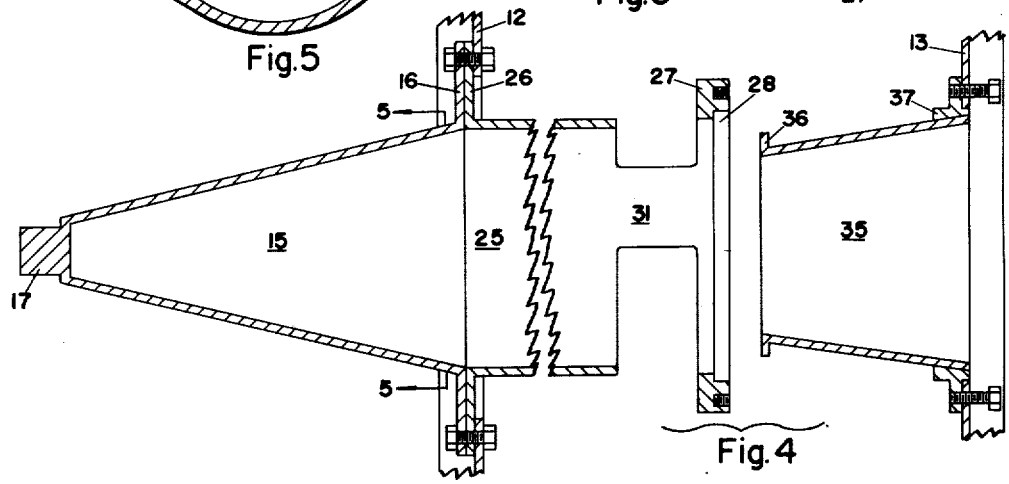
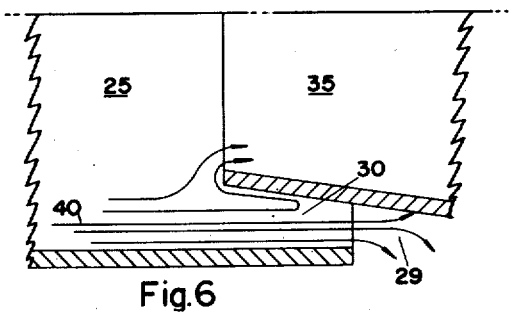
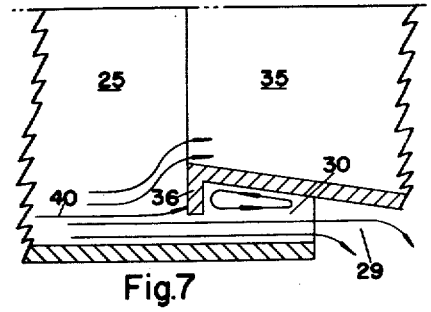
INVENTOR.
KARL L. WESTLIN
BY Arthur Robert
atty.

United States Patent Office 2,806,550
Patented Sept. 17, 1957

2,806,550

DUST SEPARATORS OR CONCENTRATORS OF THE CYCLONE TYPE

Karl L. Westlin, Louisville, Ky., assignor to American Air Filter Company, Inc., Louisville, Ky., a corporation of Delaware Application December 9, 1953, Serial No. 397,122

13 Claims. (Cl. 183—80)

This invention relates to dust separators or concentrators of the cyclone type wherein gas is introduced tangentially into a cylindrical body causing it to whirl as it travels axially along that body and thereby concentrate its dust load in the outer portion of the gas stream so that clean gas may be removed from the central portion thereof.

While it is often said that cyclonic dust separators or concentrators vortex the gas passing through them, few, if any, induce gas flow conditions which closely approaches that of a true vortex. In a true vortex, the static pressure increases from the center to the periphery in direct proportion to the centrifugal forces developed by the gas and the energy in the gas stream is constant at all radial points which promotes smooth or undisturbed air flow conditions.

The principal object of this invention is to provide a novel cyclonic dust concentrator in which the gas flow conditions approach that of a true vortex.

Another important object is to provide a novel vortexing dust concentrator of the straight-through type wherein the gas flows axially in one direction only from inlet to outlet.

Another important object is to provide a novel vortexing dust concentrator of the straight-through type having an air handling capacity which is high in relation to its overall cross sectional area taken transversely across the gas flow and, which preferably is high in relation to the overall volume of space it occupies.

Another important object is to provide a novel vortexing dust concentrator of the straight-through type which is of simple design making it relatively inexpensive to build.

A further object is to provide a simple type of vortexing dust concentrator of the straight-through type which may be readily mounted in banks.

The invention is illustrated in the accompanying drawings wherein:

Figure 3 is an enlarged partly broken view of the Figure 1 bank of concentrators;

Figure 4 is a partly exploded view of one of the concentrators shown in Figure 3;

Figure 5 is a sectional view taken along line 5—5 of Figure 4; and

Figures 6 and 7 are schematic views illustrating gas flow conditions at the outlet end of the concentrator with different structural arrangements.

Figure 1:
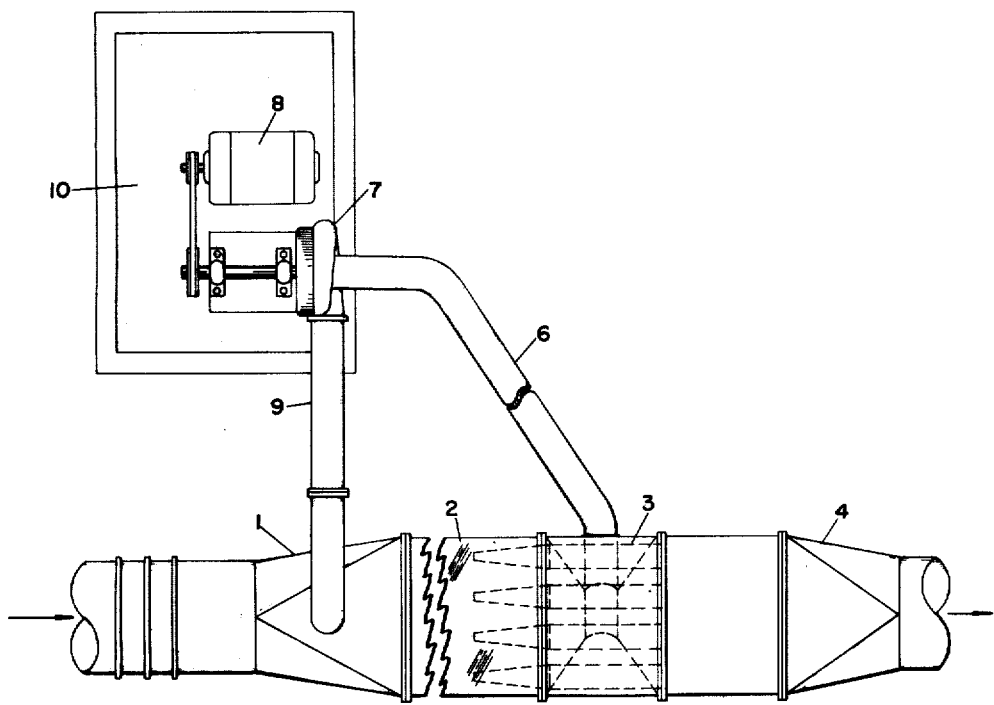
Figure 1 is a plan view of a gas cleaning installation embodying a bank of dust concentrators constructed in accordance with my invention.
Figure 2:
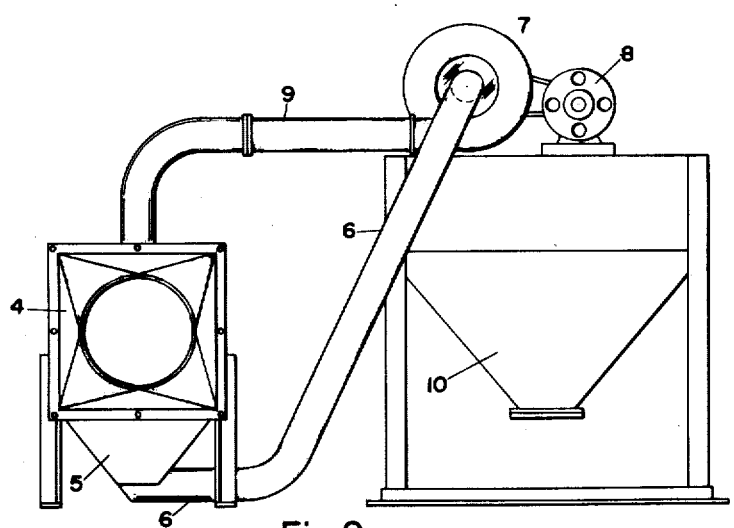
Figure 2 is an elevational view of the clean gas outlet of the installation shown in Figure 1.

The dust collecting installation illustrated in Figures 1 and 2 comprises: a main gas flow system; and a secondary gas flow system, which preferably, but not necessarily, is of the recycling type.

In the main gas flow system, the main volume of gas passes successively through an intake pipe 1, a plenum chamber casing 2, a dust concentrator housing 3 containing a concentration tube also designated 3, this tube being constructed in accordance with my invention, and a clean gas outlet 4. The dust concentrator tube 3 concentrates the dust in an outer portion of the gas stream, and, when a secondary gas flow is set up in the secondary system, it directs that outer portion of the gas stream into a hopper 5 which forms one element of the secondary gas flow system.

In the secondary gas flow system, the secondary gas flow, which usually approximates about 10% of the volume of the main gas flow, passes successively through the bottom of hopper 5, an intake conduit 6, a dust separator 7 which is driven by motor 8, and an outlet conduit 9 leading back into the main intake pipe 1 of the main gas flow system. The separator 7 preferably is of the blower-separator type, one example of which is shown in U. S. Sylvan Patent 2,247,528 dated July 1, 1941. This type of separator not only provides blower action to create the secondary gas flow but also effects the separation of the dust from that gas flow, the separated dust being directed into a dust receiving system, which, in the present case, comprises hopper 10. Any other form of dust separator may be employed, but, if a non-blower type of separator is used, a suitable blower should be provided in the secondary gas flow system.

The dust concentrator housing 3 of Figures 1 and 2 has its upstream and downstream ends closed by upstream and downstream plates 12 and 13 respectively. Its lower end is open so as to place the hopper 5 in open communication with the overlying dust chamber formed in the housing between plates 12 and 13. The concentrator housing 3 carries a bank of individual dust concentrator tubes 3, each of which is constructed to operate in accordance with my invention. These concentrator tubes are arranged in spaced parallel relationship to extend longitudinally across the dust chamber from one plate to the other with their upstream ends projecting through suitable openings in plate 12 and with their downstream ends connected to suitable openings in the downstream plate 13.

Each concentrator tube comprises: an elongate hollow body having an inlet end section and an outlet end section positioned in end-to-end relationship to constrain gas to flow axially in one direction from the inlet section through the outlet section to the outlet end thereof; the inlet end section providing a conical space, which increases cross-sectionally in the axial direction of gas flow, and a peripheral inlet delivering gas tangentially into that space substantially throughout the length of that space so as to vortex the gas therein and tend to concentrate its dust content in the outer portion of the gas stream as that stream approaches the large end of that space; the outlet end section providing a cylindrical continuation of gas flow space from the outlet end of the inlet section to accommodate the vortexing gas flow; and outlet means dividing the outlet end of said outlet end section into an inner axially-disposed clean gas outlet and an outer dust outlet chamber or ring positioned to receive the outer portion of the gas stream containing the concentrated dust, said dust outlet chamber being adapted for connection to a secondary gas flow system. The outlet end section preferably includes a concentrating portion between the inlet cone and the outlet means in order to give the gas borne particles additional time to concentrate in the outer portion of the gas stream as that stream approaches the outlet means where the inner clean gas is separated from the outer dusty gas. The outlet end section may, therefore, be termed a concentrating outlet end section.

The elongate body, as illustrated in the drawings, includes inlet and concentrating outlet end sections 15 and 25. These sections are hollow and positioned in end-to-end relationship so as to constrain gas to flow through the body axially in one direction from the inlet end to the outlet end. Their adjacent ends have abutting flanges 16 and 26, which are bolted or otherwise secured together and to plate 12, but these sections may be integrally formed if desired.

The interior of the inlet section 15 forms a conical space which increases cross sectionally in the direction of gas flow; hence this section preferably is made in the form of a cone. This cone 15 is shown as a straight sided cone but its side walls may, of course, be curved. It is closed at its smaller end by a stud 17 which aids in machining operations. The inlet cone 15 has a peripheral inlet 18 delivering gas tangentially into its conical space substantially throughout the length of that space so as to create and maintain a vortex throughout the length of the section. This slot 18 tapers lengthwise in a direction increasing its width from the small end of section 15 to the large end thereof. The rate of this taper preferably is such as to maintain, throughout the length of the cone, a substantially constant ratio of slot area to cone area at corresponding points. The slot 18 is shown as extending in a straight axial direction but it may curve as it proceeds axially. Only one slot is shown but it will be understood that several may be employed. The slot 18 preferably is provided with outwardly flared guide vanes 19 and 20 so that the slot also tapers in the general direction of the air flow through it. The vane 20 constitutes a more or less tangential extension of the conical wall of section 15.

The area of the connecting ends of the inlet and concentrating sections 15 and 25 should be substantially equal or, at least, avoid abrupt changes of any magnitude sufficient to distort gas flow conditions. Such abrupt area changes are of course to be avoided at all points along the gas flow.

The concentrating outlet end section 25 provides a cylindrical continuation of gas flow space proceeding axially from the outlet end of the inlet section 15. This cylindrical continuation may be conical and of either increasing or decreasing cross sectional area in the direction of axial air flow. Preferably however, it is in the form of a true cylinder of uniform cross sectional area, which functions to accommodate the axially-flowing vortex, created in the inlet section, and give the gas borne particles additional time to concentrate in the outer portion of the gas stream. The length of this section must neither be too small nor be too large if optimum operating conditions are to be achieved.

The cylindrical concentrating section 25 extends from its flange connection 26 with the inlet section 15 at plate 12, to the vicinity of plate 13 where it terminates in an annular securing ring 27 containing a seat 28. This outlet cylinder 25 has diametrically opposed wall portions cut away adjacent the securing ring 27 to provide discharge openings 29 for the secondary gas stream leaving the dust ring 30. The cut away portions leave webs 31 connecting the main body of the cylinder 25 to its securing ring 27.

The means dividing the outlet end of the body into an inner axially disposed clean gas outlet and an outer annular dust chamber or ring positioned to receive the outer portion of the gas stream containing the concentrated dust, includes a conical gas outlet pipe 35 terminating at its small end in an outwardly directed deflector 36, in the form of an annular flange, and, at its large end, in a securing ring 37. This securing ring 37 is dimensioned to fit snugly upon seat 28 of securing ring 27 on the concentrating system. The rings 27 and 37 are bolted to each other and to the housing plate 13. The conical pipe 35 projects from its securing ring 37 into the adjacent end of cylinder 25. It tapers in the same upstream direction so that it not only provides an inner axially disposed clean gas outlet, which is also designated by the numeral 35, but also cooperates with the outwardly spaced surrounding portion of the cylinder 25 to provide therebetween an outer annular dust chamber or ring 30, the axial cross sectional area of which tapers in the downstream direction.

In operation, gas enters the slot 18 tangentially creating a vortex in the inlet cone 15 which subjects the gas borne dust particles to intensive centrifugation. As a result of this action, the particles tend to, and most of them do, concentrate in the outer portion of the gas flow as they move toward the concentrating section 25. The length of the concentrating section 25 is designed to give some of the remaining particles enough time to concentrate in the outer portion before they reach the separating area. Upon reaching the separating area, the centrally disposed clean gas passes through outlet pipe 35 while the outer portion of the gas stream, containing the concentrated dust, passes through the ring chamber 30 and openings 29 into the secondary gas flow system. Here, as explained before, the dust is separated by the blower-separator 7, which directs the dust into hopper 10 and the relatively clean air through conduit 9 back into intake conduit 1.

The conical inlet end section of my device induces gas flow conditions approaching those of a true vortex. The axial velocity conditions, prevailing in the column of gas moving through the conical section 15, are extremely difficult to measure or otherwise determine. There is some reason to believe that the axial velocity along the periphery of the gas column may be constant while, along the center of the column, it may first increase as the gas travels toward the large end of the inlet section, and, then, before or after the gas reaches that end, decrease somewhat. The rotational velocity at the center of the column progressively increases in the direction of gas flow through the conical section 15 while the rotational velocity along the periphery remains constant. This rotational velocity increase at the center subjects any particles in this area to progressively higher centrifugal forces. The static pressure along the center progressively decreases in the direction of gas flow while the static pressure along the periphery remains substantially constant. In other words, the differential between the static pressure in the center and the periphery increases progressively in the direction of gas flow because the static pressure at the center of the gas flow is progressively smaller.

With a reasonably smooth inner wall surface, the inlet cone 15 provides little or no obstruction to the gas flow so that smooth flow conditions are preserved throughout the cone with relatively little energy loss. The preservation of smooth flow conditions promotes the outward travel of dust borne particles and minimizes the possibility of dust moving inwardly as is necessarily the case where flow conditions are disturbed to the point where radially successive layers of gas substantially intermix. Furthermore, the dust contained in the gas introduced in the small end half of the cone has ample time to move to the outer portion of the gas flow while the gas introduced in the large half of the cone tends to remain in the outer portion of the whirling gas flow so that its dust content normally tends to stay in the outer portion.

Figures 6 and 7, which schematically illustrate the outlet end of the concentrator, are identical except that Figure 6 omits the deflector 36 at the small end of the axially-disposed outlet cone 35. In Figure 6, it will be noted that some of the gas entering the dust ring 30 passes directly through the discharge openings 29. However, in Figure 6, the area from the small end of cone 35 to the outwardly spaced wall of the concentrator 25 approximates 7/16 of the area of the concentrator. This outer area, which should accommodate 10% of the total gas flow, is substantially greater than 10% of the available area. Due to this area disparity and to the pressure differential existing between the interior of dust chamber 30 and the interior of outlet cone 35, not all of the gas entering the dust ring 30 of Figure 6 will pass through the discharge opening 29. As a matter of fact, there will be a line of demarcation between the 10% volume of gas which flows entirely through the dust chamber 30 and the other gas which reverses its flow within chamber 30 to join and flow with the clean gas. The reversal of gas flow within chamber 30 is bound to disturb air flow conditions in the immediate vicinity and thus tend not only to increase the air flow resistance but possibly also pick up some of the dust from the center portion of the gas flow and thereby decrease the efficiency of separation. The line of demarcation between the clean gas flow and the secondary gas flow is indicated by the arrow 40. The arrow 40 in Figure 6 makes clear that the effective area of dust chamber 30 at the small end of outlet cone 35 is much smaller than the actual area.

By adding deflector 36 to the small end of outlet cone 35, as illustrated in Figure 7, the escape of dusty gas is prevented without reducing the effective area at the entrance to the dust chamber 30.

I have obtained excellent results with a separator of the type disclosed in this application having the following dimensions: the slope of the cone 15 approximates 6° while its axial length is between 14 and 15"; the inlet slot increases in width from $21/64"$ at the small end of the cone 15 to $56/64"$ at the large end thereof; the internal diameter of the cone 15 increases from 1 inch at its small end to 4 inches at its large end; the concentrator 25 has an internal diameter of 4" and an over-all length of $11 11/16"$, the openings 29 having an axial length of $13/16"$; and the outlet cone 35 has an internal diameter increasing from 3" at its small end to 4" at its large end.

With these dimensions: the inlet volume was 333 C. F. M.; the inlet velocity through the 14" long slot was 6250 feet per minute; the axial velocity through the cone and cylinder was 4190 feet per minute; the axial velocity at the small end of the outlet cone 35 was 6790 feet per minute; the volume of clean gas was 300 C. F. M.; and the over-all pressure drop was 4½" water gauge. Under these conditions of operation, the cleaning efficiency ranged from 83 to 87% on fly ash averaging 11 microns in particle size.

Having described my invention, I claim:

1. An improvement in the inlet end portion of dust separators or concentrators of the cyclone type wherein gas, introduced into a cylindrical body, is caused to whirl as it travels axially along that body and thereby concentrate its dust load in the outer portion of the gas stream so that clean gas may be removed from the central portion thereof, comprising: an inlet section having a conical inner wall surface which is open at its large end and provides a conical space, which receives the incoming unclean gas peripherally and discharges the same unclean gas axially through its large end, said inner wall surface containing at least one relatively long and narrow peripheral inlet slot extending substantially throughout the length of said conical space, the walls of said slot being shaped to deliver gas tangentially into the periphery of said conical space so as to vortex the gas therein and tend to concentrate its dust content in the outer portion of the gas stream as that stream approaches the large end of that space, said inner wall surface being free of outlet openings along that portion of the conical space corresponding to said peripheral inlet slot.

2. A dust concentrator comprising: an elongate hollow body having an inlet end section and an outlet end section positioned in end-to-end relationship to constrain gas to flow axially in one direction from the inlet section through the outlet section to the outlet end thereof; the inlet section having an inner wall surface providing a conical space, which receives the incoming unclean gas peripherally and discharges the same unclean gas axially through its large end, said inner wall surface containing at least one peripheral inlet opening for delivering gas tangentially into said conical space, said opening extending substantially throughout the length of that space so as to vortex the gas therein and tend to concentrate its dust content in the outer portion of the gas stream as that stream approaches the large end of that space, said inner surface being free of substantial gas-flow obstructions and outlet openings along that portion of the conical space corresponding to said peripheral inlet; the outlet section providing a cylindrical continuation of gas flow space from the outlet end of the inlet section to accommodate the vortexing gas flow; and outlet means dividing the outlet end of said outlet section into an inner axially-disposed clean gas outlet and an outer dust outlet chamber positioned to receive the outer portion of the gas stream containing the concentrated dust.

3. The concentrator of claim 1 wherein: the inlet end section of said body is in the form of a cone.

4. A dust concentrator comprising: an elongate hollow body having an inlet end section and a concentrating outlet end section positioned in end-to-end relationship to constrain gas to flow axially in one direction from the inlet section through the concentrating section to the outlet end thereof; the inlet section having an inner wall surface providing a conical space, which receives the incoming unclean gas peripherally and discharges the same unclean gas axially through its large end, said inner wall surface containing at least one peripheral inlet opening for delivering gas tangentially into said conical space, said opening extending substantially throughout the length of that space so as to vortex the gas therein and tend to concentrate its dust content in the outer portion of the gas stream as that stream approaches the large end of that space, said inner surface being free of substantial gas-flow obstructions and outlet openings along that portion of the conical space corresponding to said peripheral inlet; the concentrating section providing a cylindrical continuation of gas flow space from the outlet end of the inlet section to accommodate the vortexing gas flow and give the gas borne particles additional time to concentrate in the outer portion of the gas stream as that stream approaches the outlet end thereof; and outlet means spaced downstream from the inlet section, said outlet means dividing the outlet end of said concentrating section into an inner axially-disposed clean gas outlet and an outer dust outlet chamber positioned to receive the outer portion of the gas stream containing the concentrated dust.

5. The concentrator of claim 4 wherein: the inlet end section of said body is in the form of a cone.

6. The concentrator of claim 5 wherein: said cone is a straight sided cone.

7. The concentrator of claim 4 wherein: said inlet section peripheral inlet is in the form of a slot.

8. The concentrator of claim 7 wherein: said slot increases in width in the axial direction of gas flow.

9. The concentrator of claim 4 wherein: the concentrating section is in the form of a cylinder of substantially uniform cross sectional area.

10. The concentrator of claim 4 wherein: said dividing means includes a cone having its small end projecting upstream into the concentrating section.

11. The concentrator of claim 10 wherein: the small end of said cone is annually flanged to extend outwardly but not upstream.

12. The concentrator of claim 4 wherein: the inlet section is in the form of a cone; the concentrating section is in the form of a cylinder of substantially uniform cross sectional area; and the dividing means includes a cone having its small end projecting upstream into the concentrating section.

13. The concentrator of claim 12 wherein: the inlet section has an inlet slot which increases in width in the axial direction of gas flow; and the small end of the dividing means cone is annularly flanged to extend outwardly but not upstream.

(References on following page)

References Cited in the file of this patent

UNITED STATES PATENTS

| | | |
|---|---|---|
| 424,157 | Woodbury et al. | Mar. 25, 1890 |
| 516,371 | Gale | Mar. 13, 1894 |
| 771,691 | Allington | Oct. 4, 1904 |
| 2,647,588 | Miller | Aug. 5, 1953 |
| 2,662,610 | Heinrich | Dec. 15, 1953 |

FOREIGN PATENTS

| | | |
|---|---|---|
| 20,412 | Great Britain | Sept. 13, 1907 |
| 902,476 | France | Dec. 15, 1944 |

UNITED STATES PATENT OFFICE
CERTIFICATE OF CORRECTION

Patent No. 2,806,550            September 17, 1957

Karl L. Westlin

It is hereby certified that error appears in the printed specification of the above numbered patent requiring correction and that the said Letters Patent should read as corrected below.

Column 6, line 13, for the claim reference numeral "1" read -- 2 --.

Signed and sealed this 24th day of December 1957.

(SEAL)

Attest:
KARL H. AXLINE
Attesting Officer

ROBERT C. WATSON
Commissioner of Patents